United States Patent
Shirman et al.

[11] Patent Number: 6,151,029
[45] Date of Patent: Nov. 21, 2000

[54] TEXTURE MAPPING WITH IMPROVED TECHNIQUE FOR SELECTING AN APPROPRIATE LEVEL IN FILTERED REPRESENTATIONS OF THE TEXTURE

[75] Inventors: Leon Shirman, Redwood City; Yakov Kamen, Cupertino, both of Calif.

[73] Assignee: Seiko Epson Corporation, Tokyo, Japan

[21] Appl. No.: 08/971,972

[22] Filed: Nov. 17, 1997

Related U.S. Application Data

[60] Provisional application No. 60/056,812, Aug. 22, 1997.

[51] Int. Cl.[7] .................................................. G06T 17/00
[52] U.S. Cl. ..................................... 345/428; 345/430
[58] Field of Search ..................... 345/428, 430, 345/429, 425

[56] References Cited

U.S. PATENT DOCUMENTS

| | | | |
|---|---|---|---|
| 4,615,013 | 9/1986 | Yan et al. | 345/521 |
| 5,097,427 | 3/1992 | Lathrop et al. | 345/430 |
| 5,446,833 | 8/1995 | Miller et al. | 345/425 |
| 5,495,563 | 2/1996 | Winser | 345/430 |
| 5,544,292 | 8/1996 | Winser | 345/430 |
| 5,550,960 | 8/1996 | Shirman et al. | 345/430 |
| 5,561,756 | 10/1996 | Miller et al. | 345/326 |
| 5,566,284 | 10/1996 | Wakayama | 345/430 |
| 5,594,846 | 1/1997 | Donovan | 345/430 |
| 5,606,650 | 2/1997 | Kelley et al. | 345/430 |
| 5,651,104 | 7/1997 | Cosman | 345/428 |

*Primary Examiner*—Mark K. Zimmerman
*Assistant Examiner*—Philip H. Stevenson

[57] ABSTRACT

A device is provided for generating output signals representing an image comprising a plurality of pixels, each pixel having a respective location within the image. The device comprises one or more signal paths adapted to receive a first signal representing position of a surface to be displayed in an image and a second signal representing texture of at least a portion of the surface. A processing circuitry is adapted to determine a correspondence between a respective pixel in the image and an area of the texture. The correspondence is determined according to the first and second signals and position of the respective pixel within the image, and wherein the correspondence includes a homogeneous coordinate. The processing circuitry further generates a third signal representing the respective pixel. The third signal is generated by interpolating a plurality of filtered representations of the texture according to a level obtained from a function of the homogeneous coordinate, and generates a respective output signal representing information conveyed by the third signal. The second signals represent texture of a portion of the surface that is triangular and has three vertices with corresponding homogeous coordiates $w_0$, $w_1$ and $w_2$, respectively, and the function d of the homogeneous coordiate w is $d=\hat{d}+2\log(\hat{q})-2\log(q)$, where $\hat{d}$ is a constant representing an average level across the triangular portion, $q=1/w$, $q_0=1/w_0$, $q_1=1/w_1$, $q_2=1/w_2$, and $\hat{q}=\sqrt[3]{q_0 q_1 q_2}$.

21 Claims, 3 Drawing Sheets

TEXTURE MAPPING WITH IMPROVED TECHNIQUE FOR SELECTING AN APPROPRIATE LEVEL IN FILTERED REPRESENTATIONS OF THE TEXTURE

CROSS-REFERENCE TO RELATED APPLICATION

This application claims priority benefits of prior filed copending U.S. provisional application Ser. No. 60/056,812, filed Aug. 22, 1997.

TECHNICAL FIELD

The present invention relates generally to techniques for displaying images. The present invention relates more particularly to an efficient technique for mapping textures or patterns onto three-dimensional surfaces so as to display a more realistic image.

BACKGROUND ART

Many display systems present images by generating output signals representing thousands of picture elements or "pixels." The color and intensity of each pixel is controlled by a respective output signal that is generated according to associated pixel data.

Many applications attempt to generate realistic displays of three-dimensional objects by forming pixel data that represent a variety of visual characteristics for object surfaces such as roughness, patterns, color and shading. One technique that is used is known as texture mapping. Conceptually, this technique maps textures onto surfaces and then projects onto a screen the mapped textures together with the surfaces. The mapping and projecting processes involve transformations from one space to another.

Generally, a texture is defined in a texture space having a two-dimensional coordinate system (u,v). The texture comprises textural elements or "texels." The surfaces of an object are defined in an object space having a three-dimensional coordinate system (x',y',z'). The resultant display or image is defined in an image space having a two-dimensional coordinate system (x,y). In concept, texture mapping transforms the texture defined in texture space onto a surface defined in the object space and then projects the transformed texture onto a display screen in the image space. This process is not unlike applying a decal, which represents the texture, onto an object and then projecting the applied decal onto a display surface. The content of pixel data formed to represent the mapped and projected texture is a function of the mapping and projecting transformations as well as the texture definition itself.

One problem that is encountered during texture mapping is aliasing. The cause of aliasing may be understood by first visualizing a texture or pattern mapped onto a surface that is parallel to the image space. The projection of the texture onto the image space (x,y) is a uniformly scaled replica of the texture definition in texture space (u,v). As the surface in object space (x',y',z') rotates, the projection of the pattern onto image space is compressed nonuniformly. The amount of compression increases as the angle between image space and the surface normal departs from ninety degrees and, for perspective projections, it also increases with increasing distance from the image space. The consequence of increased compression is that larger areas of the texture are projected onto individual pixels in image space. If the amount of compression is great enough, distinctive textural features are projected into single pixels. The net effect is aliasing. The spatial sampling frequency of the pixels in image space is not high enough to accurately represent the higher spatial frequencies in the compressed texture.

Aliasing may be avoided by filtering the texture that is projected into each pixel. Preferably, the filtering is accomplished by applying a space-variant filter to the texture definition.

One way in which a space-variant filter may be applied is to map an individual pixel in image space (x,y) onto the texture, forming a pixel "footprint" in texture space (u,v), and then generate pixel data by filtering or averaging the texels in the pixel footprint. This approach requires considerable computational resources because pixel data must be generated for many thousands, perhaps millions, of pixels and because many thousands, perhaps millions, of texels must be filtered for individual pixels.

Another way, which avoids or at least reduces aliasing effects and requires considerably lower computation resources, uses filtered representations of the texture. One type of filtered representations is described in Dungan, et al., "Texture Tile Considerations for Raster Graphics," *Computer Graphics*, vol. 12, no. 3, August 1978, pp. 130–134. Another type of filtered representations, known as a MIP map, is discussed in Williams, "Pyramidal Parametrics," *Computer Graphics*, vol. 17, no. 3, July 1983, pp. 1–11. The MIP map is a pyramidal structure in which the bottom level, level 0, contains texels from a square area of the texture definition itself and each successively higher level contains one-fourth the number of texels. For example, each texel in level d+1 corresponds to four texels in level d. Stated differently, the spatial resolution of the texture for each dimension in level d+1 is one-half the spatial resolution for each dimension in level d. The filtered representations may be formed such that the spatial resolution of the texture in successive levels differs by any convenient factor.

An appropriate amount of filtering is applied to a given pixel by selecting an appropriate level in the filtered representations. The selected level need not be an integer. The fractional part of a selected level may be realized by trilinear interpolation of texels in adjacent levels.

Several methods for selecting the appropriate level are known. One method selects the level based on the longest dimension of the pixel footprint in texture space. Another method, which maps circular pixels onto elliptical areas in texture space, selects the level based on the average diameter of the ellipse. Other methods, which map square pixels onto curvilinear polygons in texture space, select levels based on values derived from the length of one or more sides of the polygons. Yet another method selects the level from values based on partial derivatives of the pixel mapping in texture space with respect to the image space. An example of a device that uses partial derivatives to select a level is disclosed in U.S. Pat. No. 5,097,427, which is incorporated herein by reference in its entirety.

The selection of level is important. If the selected level is too high, the resultant image will be blurred. If the selected level is too low, the resultant image will contain aliasing. As a result, the level should be selected for each pixel in the image. Unfortunately, known methods for selecting the level all require considerable processing resources.

DISCLOSURE OF INVENTION

It is an object of the present invention to improve the efficiency of texture mapping techniques by providing for a more efficient way to select an appropriate level of filtered representations of a texture such as a MIP map.

According to the teachings of the present invention, output signals are generated representing an image comprising a plurality of pixels by receiving first signals representing position of a surface to be displayed in the image, receiving second signals representing texture of at least a portion of the surface, determining a correspondence between a respective one of the pixels and an area of the texture, where the correspondence is determined according to the first and second signals and the position of the respective pixel within the image and includes a homogeneous coordinate, generating a third signal representing the respective pixel, where the third signal is generated by interpolating a plurality of filtered representations of the texture according to a level obtained from a function of the homogeneous coordinate, and (5) generating a respective output signal representing information conveyed by the third signal. The term "texture" as used herein may apply to essentially any visible feature such as apparent roughness, pattern, color hue or shading.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

MODES FOR CARRYING OUT THE INVENTION

Display Subsystem

The present invention pertains to features that improve the efficiency of rendering realistic images of three-dimensional objects. In typical computer applications, the techniques of the present invention may be performed by devices such as display controllers, may be implemented in software executed by system processors, or may be implemented in a wide variety of other ways including a combination of processes performed by display controllers and software-controlled system processors. The present invention is not limited to any particular computer architecture and may be practiced in devices such as video monitors or television receivers which generally are not regarded as computers. The present invention could also be used in printing applications which render images using an array of dots.

In the following discussion, the present invention is described within the context of a display controller of a typical microprocessor-based computer system. As explained above, however, none of the components within the exemplary computer system are required to practice the present invention.

Figure 1:
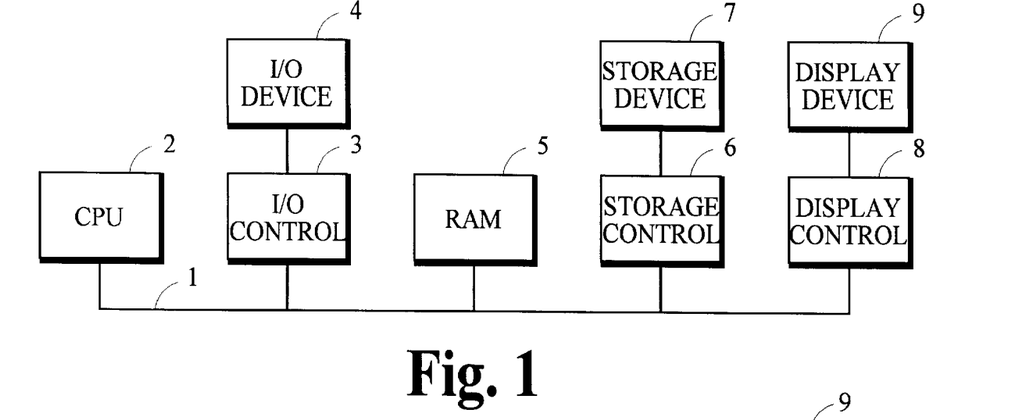
FIG. 1 is a functional block diagram of a typical personal computer including a display controller for interfacing with a display device.

FIG. 1 is a functional block diagram of a typical personal computer incorporating a display controller for interfacing with a display device. CPU 2 provides computing resources. I/O control 3 represents an interface to I/O device 4 such as a keyboard, mouse, modem or printer. Storage control 6 represents an interface to storage device 7 such as a magnetic tape drive or a disk drive. Display control 8 provides an interface to display device 9. RAM 5 is system random access memory, which should not be confused with any memory that may exist in display control 8. The functions of one or more of these components can be implemented in a wide variety of ways including discrete logic components, one or more ASICs and/or program-controlled processors.

All major system components connect to bus 1 which may represent more than one physical bus. For example, some personal computers incorporate only a so called Industry Standard Architecture (ISA) bus. Other computers incorporate an ISA bus as well as a higher bandwidth bus conforming to some bus standard such as the VESA local bus standard or the PCI local bus standard. Preferably, display control 8 connects to a high-bandwidth bus to improve the speed of display; however, a bus architecture is not required to practice the present invention.

Figure 2A:
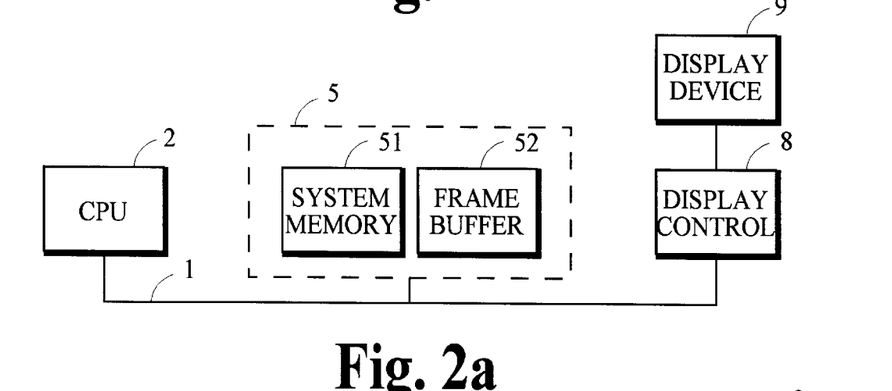
FIGS. 2a and 2b are functional block diagrams illustrating different embodiments of display subsystems within a typical personal computer.

FIG. 2a illustrates one embodiment of a display subsystem in which CPU 2 builds a pixelized representation of an image in frame buffer 52 using programs and data stored in system memory 51. Both frame buffer 52 and system memory 51 are allocated in RAM 5. Display control 8 displays an image on display device 9 that is defined by the information stored in frame buffer 52. In such an embodiment, the present invention may be implemented entirely in software executed by CPU 2. In an alternative embodiment, display control 8 accesses frame buffer 52 directly along a path not illustrated rather than through bus 1.

Figure 2B:
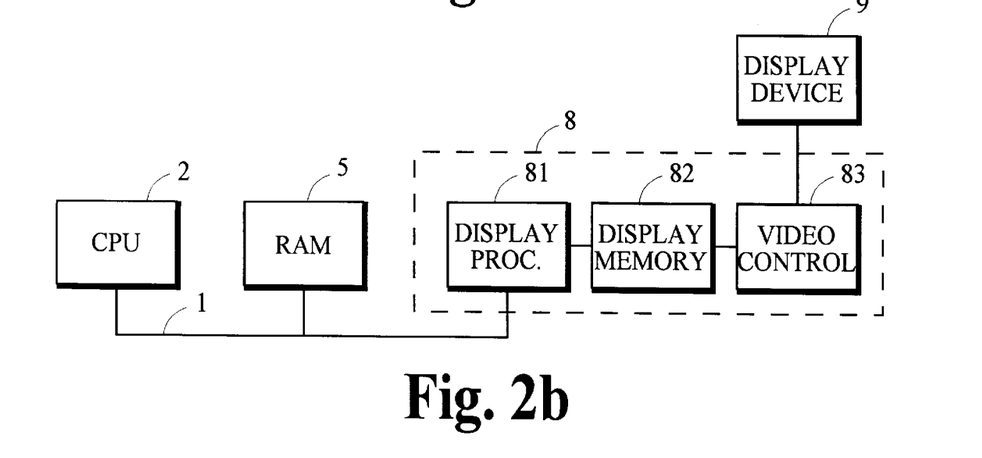

FIG. 2b illustrates another embodiment of a display subsystem in which display processor 81 builds a pixelized representation of an image in a frame buffer within display memory 82 in response to data and commands received from bus 1. Video control 83 displays an image on display device 9 that is defined by the information stored in the frame buffer within display memory 82. In such an embodiment, the present invention may be performed entirely by display processor 81.

Many variations including a hybrid of the two illustrated embodiments are possible. For example, portions of the present invention may be carried out by special hardware such as display processor 81 and other portions may be carried out by CPU 2. Furthermore, all or part of the present invention may be carried out within the process that generates signals sent to display device 9 by manipulating information as it is obtained from the frame buffer. As these examples show, no particular architecture is critical to the practice of the present invention. In preferred embodiments, however, the present invention is carried out within one or more processes that are responsible for constructing and storing pixel representations into a frame buffer.

FIGS. 2a and 2b are schematic illustrations that omit a variety of features such as buffers, registers, latches, clocks and controllers that are used in many practical implementations. These features, which are not essential to either understand or practice the present invention, are omitted from the figures for the sake of clarity.

Figure 3:
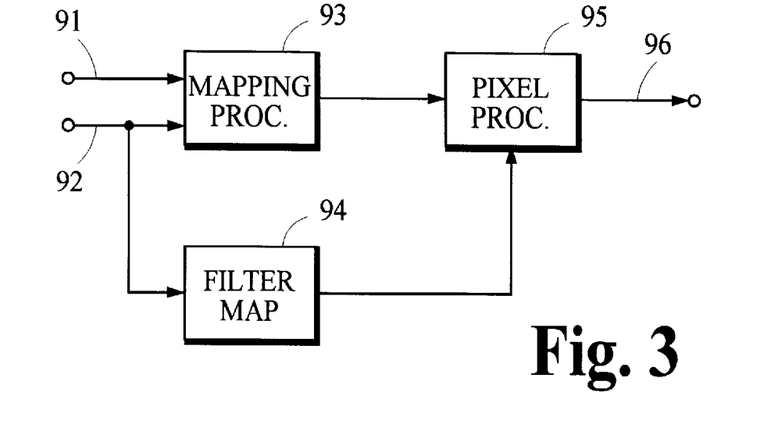
FIG. 3 is a schematic functional block diagram of a device that may be used to implement various aspects of the present invention.

FIG. 3 is a schematic functional block diagram of a device that may be used to implement various aspects of the present invention. This diagram is intended to help explain the present invention and is not intended to represent any particular implementation. As explained above, these functional features may be implemented in a variety of ways including hardware and/or software, may be performed in a single device or may be performed collectively by multiple devices.

Mapping processor 93 receives from path 91 a signal that represents the position of a surface to be displayed, and receives from path 92 a signal that represents a texture to be displayed on the surface. In response to these signals, mapping processor 93 determines a correspondence between pixels of the displayed image and areas of the texture. This correspondence may be determined by applying various forward or inverse mappings as described below. The correspondence determined by mapping processor 93 includes a weight, commonly referred to as a homogeneous coordinate.

Filter map 94 provides filtered representations of the texture. A MIP map is one example of suitable filtered representations. These representations may be constructed by features within filter map 94 in response to the signal received from path 92 or it may be expressly provided by the signal received from path 92.

Pixel processor 95 generates along path 96 a signal representing pixel values for subsequent display. These values could be stored in a frame buffer, for example. These pixel values are generated in response to signals received from mapping processor 93, representing the homogeneous coordinates mentioned above, and in response to signals received from filter map 94, representing filtered representations of the texture. As will be explained below, pixel processor 95 determines an appropriate level d in the filtered representations for each pixel and uses this to interpolate the representations in adjacent integer-valued levels in the filtered representations.

Derivation of Measure Functions

In conceptual terms, given hierarchical filtered representations of a texture such as a MIP map, the present invention determines the appropriate level in the representations for an arbitrary pixel in an image. This determination is made according to $$d(\mu) = \mu(P) \tag{1}$$

where d=the appropriate level in the filtered representations, u=a real-valued measure function of pixels, and P=an arbitrary pixel in the image.

It is assumed that $$d(u) = d\left(\frac{\mu}{\mu_0}\mu_0\right) = d_0 \log_2(\mu_0) + \log_2(\mu) = C + \log_2(\mu) \tag{2}$$

where $d_0 = d(\mu_0)$ for some measure value $\mu_0$ and $C = d_0 - \log_2(\mu_0)$, which is a constant.

The logarithm function in expression 2 is taken to the base 2 because the spatial resolution of the texture in the filtered representations is assumed to differ between successive levels by a factor of two. Throughout the remainder of this discussion, all logarithms are taken to the base 2; therefore, the express base notation is omitted. As mentioned above, however, the filtered representations may be formed such that the spatial resolution may differ by any convenient factor. The base of the logarithm function should be chosen accordingly.

Traditionally, level estimation is based on some relationship between coordinates in screen or image space and corresponding coordinates in texture space. This relationship may be expressed in terms of functions u=u(x,y) and v=v(x,y) that map screen or image space coordinates (x,y) into texture space coordinates (u,v). From the Taylor series expansion, each of these functions may be expressed as $$u(x, y) = u(x_0, y_0) + \frac{\partial u}{\partial x}(x - x_0) + \frac{\partial u}{\partial y}(y - y_0) + \ldots \tag{3a}$$

$$v(x, y) = v(x_0, y_0) + \frac{\partial v}{\partial x}(x - x_0) + \frac{\partial v}{\partial y}(y - y_0) + \ldots \tag{3b}$$

If a pixel in screen or image space is assumed to occupy a square with a lower-left corner at $(x_0, y_0)$ having unit-length bottom and left sides aligned with the x and y axes, respectively, it may be seen that the bottom (B) and left (L) sides of the pixel map into texture space vectors as follows:

$$B \to \left(\frac{\partial u}{\partial x}, \frac{\partial v}{\partial x}\right) \tag{4a}$$

$$L \to \left(\frac{\partial u}{\partial y}, \frac{\partial v}{\partial y}\right)$$

A number of known techniques estimate the appropriate level d from some function of these two partial derivatives. For example, one technique estimates the level from the logarithm of the larger Euclidean length of the two vectors, or $$d = \log\left(\max\left[\sqrt{\left(\frac{\partial u}{\partial x}\right)^2 + \left(\frac{\partial v}{\partial x}\right)^2}, \sqrt{\left(\frac{\partial u}{\partial x}\right)^2 + \left(\frac{\partial v}{\partial x}\right)^2}\right]\right) \tag{5}$$

Unfortunately, this expression as well as other known expressions are not invariant under rigid transformations such as rotation. This may be overcome by taking the partial derivatives along a specified direction and finding a maximum or an average of these derivatives. It may be seen that the partial derivatives of u and v with respect to a direction s may be expressed as $$\frac{\partial u}{\partial s} = \frac{\partial u}{\partial x}\cos\alpha + \frac{\partial u}{\partial y}\sin\alpha \tag{6b}$$

$$\frac{\partial v}{\partial s} = \frac{\partial v}{\partial x}\cos\alpha + \frac{\partial v}{\partial y}\sin\alpha$$

where s=the unit vector (cos α, sin α) in screen or image space.

The square of the Euclidean length of the partial derivatives in texture space is $$l^2 = \left(\frac{\partial u}{\partial s}\right)^2 + \left(\frac{\partial v}{\partial s}\right)^2 \tag{7}$$

-continued $$= \left(\frac{\partial u}{\partial x}\cos\alpha + \frac{\partial u}{\partial y}\sin\alpha\right)^2 + \left(\frac{\partial v}{\partial x}\cos\alpha + \frac{\partial v}{\partial y}\sin\alpha\right)^2$$

The average square length may be obtained by integrating the derivatives about a full circle, or $$\hat{l}^2 = \frac{1}{2\pi}\int_0^{2\pi}\left(\frac{\partial u}{\partial s}\right)^2 + \left(\frac{\partial v}{\partial s}\right)^2 d\alpha \qquad (8)$$

$$= \frac{1}{2}\left[\left(\frac{\partial u}{\partial x}\right)^2 + \left(\frac{\partial u}{\partial y}\right)^2 + \left(\frac{\partial v}{\partial x}\right)^2 + \left(\frac{\partial v}{\partial y}\right)^2\right]$$

where
$\hat{l}$=average length of a vector having elements equal to the value of the partial derivatives.

This average length may be used to obtain an appropriate level d, which is invariant under rigid transformation, as follows:

$$d = \log(\hat{l}) = \frac{1}{2}\log(\hat{l}^2) \qquad (9)$$

$$= \frac{1}{2}\log\left\{\frac{1}{2}\left[\left(\frac{\partial u}{\partial x}\right)^2 + \left(\frac{\partial u}{\partial y}\right)^2 + \left(\frac{\partial v}{\partial x}\right)^2 + \left(\frac{\partial v}{\partial y}\right)^2\right]\right\}$$

Maximum and average lengths obtained from a wide variety of non-Euclidean norms can also be used.

Techniques that use partial derivatives to obtain an estimate of an appropriate level d generally calculate the partial derivatives numerically. A closed form can be derived. For example, consider a mapping function u along a horizontal scanline, i.e., a line along which y is a constant, having endpoints at $x_0$ and $x_1$ with corresponding texture space coordinates $u_0$ and $u_1$, respectively, and corresponding weights $w_0$ and $w_1$, respectively. The weight w is commonly referred to as the homogeneous coordinate and represents the distance between a point in object space and the corresponding point projected onto screen or image space. The mapping function u may be represented as $$u(x) = \frac{\frac{u_0}{w_0} + t\left(\frac{u_1}{w_1} - \frac{u_0}{w_0}\right)}{\frac{1}{w_0} + t\left(\frac{1}{w_1} - \frac{1}{w_0}\right)} \qquad (10)$$

where $$t = \frac{x - x_0}{x_1 - x_0}.$$

It may be seen that the partial derivative of this function with respect to x is $$\left.\frac{\partial u}{\partial x}\right|_{y=const} = \frac{du}{dx} \qquad (11)$$

$$= \frac{1}{(x_1 - x_0)}\frac{du}{dt}$$

$$= \frac{(u_1 - u_0)}{(x_1 - x_0)}\frac{w_0 w_1}{[w_1 + t(w_0 - w_1)]^2}$$

By recognizing that $w(t)=w_0+t(w_1-w_0)$ and making an appropriate substitution in this expression, it can be seen that $$\frac{du}{dx} = \frac{(u_1 - u_0)}{(x_1 - x_0)}\frac{w_0 w_1}{(w_0 + w_1 - w)^2} \qquad (12)$$

Thus, the partial derivative of the mapping function u with respect to x along a horizontal scanline varies as a function of only the homogeneous coordinate or weight w. A similar result holds for partial derivatives along a vertical scanline, i.e., a line along which x is a constant, and for derivatives along any arbitrary direction.

This expression may be rewritten in terms of an inverse weight q as follows:

$$\left.\frac{\partial u}{\partial x}\right|_{y=const} = \frac{du}{dx} = \frac{(u_1 - u_0)}{(x_1 - x_0)}\frac{1}{q^2 w_0 w_1} = \frac{(u_1 - u_0)}{(x_1 - x_0)}\frac{q_0 q_1}{q^2} \qquad (13)$$

where $$q(t) = \frac{1}{w_0} + t\left(\frac{1}{w_1} - \frac{1}{w_0}\right),$$

$$q_0 = \frac{1}{w_0} \text{ and}$$

$$q_1 = \frac{1}{w_1}.$$

Expressions in terms of the inverse weight q are generally more convenient in practical implementations because the inverse weight q should be interpolated rather than the weight w for proper rendering of a perspective view.

By expressing the partial derivatives in terms of a constant divided by the square of the inverse weight and by interchanging the application of the log and max functions, expression 5 may be rewritten as $$d = \max[C_x - 2\log(q), C_y - 2\log(q)] \qquad (14)$$

where
$C_x$=a constant value along horizontal scanlines, i.e., lines for which y is a constant, and
$C_y$=a constant value along vertical lines, i.e., lines for which x is a constant.

Similarly, expression 9 may be rewritten as $$d=C_{xy}-2\log(q) \qquad (15)$$

where
$C_{xy}$=is a value that depends on two constants, one that is constant along horizontal scanlines and another that is constant along vertical lines.

These expressions allow an appropriate level d to be estimated much more efficiently than is possible using known techniques. Further improvements in efficiency can be obtained by deriving expressions of inverse weight q that estimate an appropriate level d for triangular areas.

This derivation begins by recognizing that an estimate of an appropriate level d for one-dimension may be expressed as $$d = \log\left(\left|\frac{du}{dx}\right|\right) = \log\left(\left|\frac{u_1 - u_0}{x_1 - x_0}\right|\right) + 2\log\left(\sqrt{q_0 q_1}\right) - 2\log(q)$$

which may be rewritten as $$d = \hat{d} + 2\log(\hat{q}) - 2\log(q) \quad (17)$$

where $\hat{d}$=average level for the entire one-dimensional segment, and $\hat{q}$=geometric average of the inverse weights at the endpoints.

Expression 17 also represents an estimate of level d for a two-dimensional triangular area where average level for the entire two-dimensional triangular area, and $$\hat{q} = \sqrt[3]{q_0 q_1 q_2} = \text{geometric average of the inverse weights at the triangle verticies.}$$

The average level $\hat{d}$ for the triangular area may be determined in a variety of ways. For example, the average can be obtained by calculating a ratio of corresponding areas in texture space and in screen or image space $$\hat{d} = \frac{1}{2}\log\left(\frac{A_T}{A_S}\right) \quad (18a)$$

where $A_T$=area in texture space, and $A_S$=corresponding area in screen or image space,
by calculating a ratio of perimeter lengths enclosing corresponding areas in the two spaces $$\hat{d} = \log\left(\frac{P_T}{P_S}\right) \quad (18b)$$

where $P_T$=perimeter in texture space, and $P_S$=corresponding perimeter in screen or image space, or by calculating a ratio of essentially any corresponding lengths in the two spaces.

Expression 2 may be rewritten as $$d(\mu) = C + \log(\mu) = C + \log[f(w)] = C + \log[g(q)] \quad (19)$$

where the measure function $\mu$ may be either some function f of weight w or some function g of inverse weight q. In the example discussed above and shown in expression 17, for example, $\mu = g(q) = q s^{-2}$.

Exemplary Implementation

Figure 4:
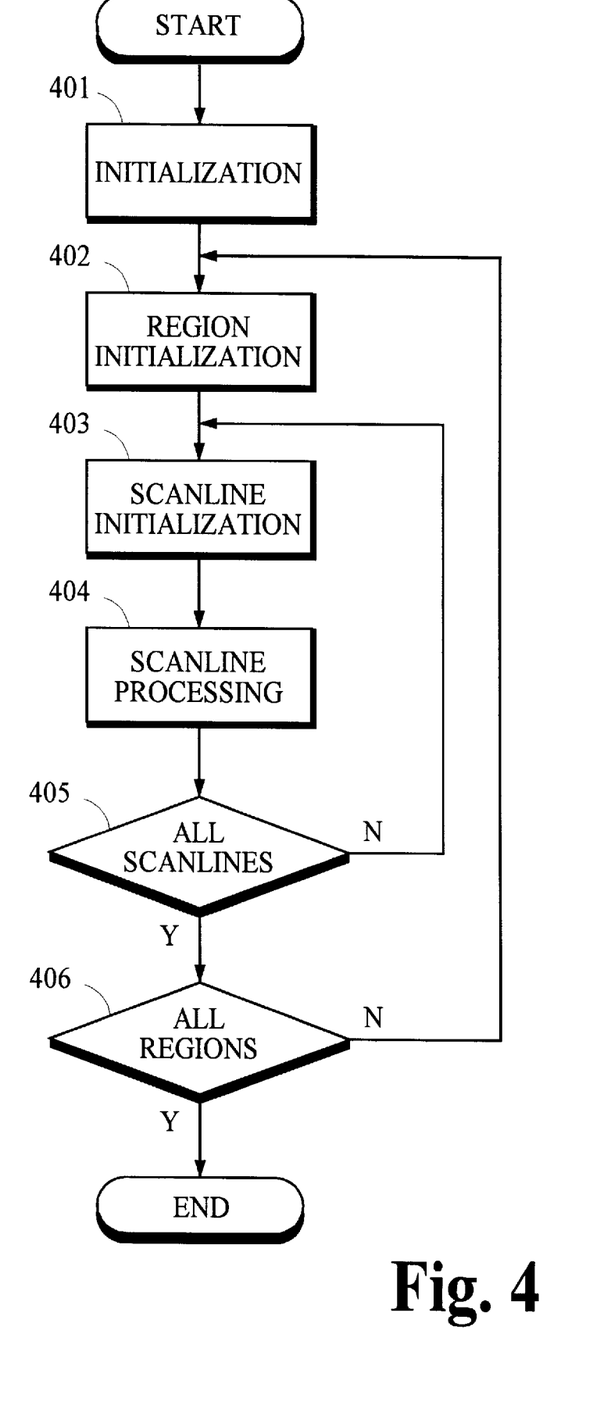
FIG. 4 is a functional block diagram of one particular process that may be used to carry out various aspects of the present invention.

FIG. 4 is a functional block diagram of one process in which the present invention is applied to pixel data in scan line order. In step 401, any desired transformations or other initialization processes may be carried out. A few examples include updating object position or ambient lighting geometry to reflect object movement or other changes and tessellating surfaces to form a mosaic of triangles that can be processed individually.

Step 401 is not required and does not form part of the present invention; however, the way in which these transformations are carried out can affect the way in which the present invention should be implemented. These transformations may be carried out in a variety of ways including forward mappings and inverse mappings.

In forward mappings, input pixel data can be processed in scanline or output order but no output pixel is guaranteed to be completely determined until the entire image is processed. In inverse mappings, output pixels are usually determined in output or scanline order but the input pixel data cannot be processed in the same order. These two mappings require two-dimensional transformations and/or filters which are expensive to implement.

In step 402, tables and constants for a respective surface region are initialized. These regions are generally circumscribed by polygons, particularly triangles. Referring to expression 17, for example, these constants include the average filter level $\hat{d}$ and the average inverse weight $\hat{q}$, discussed above. These constants may be obtained from a wide variety of calculations. A few examples are mentioned above.

Figure 5:
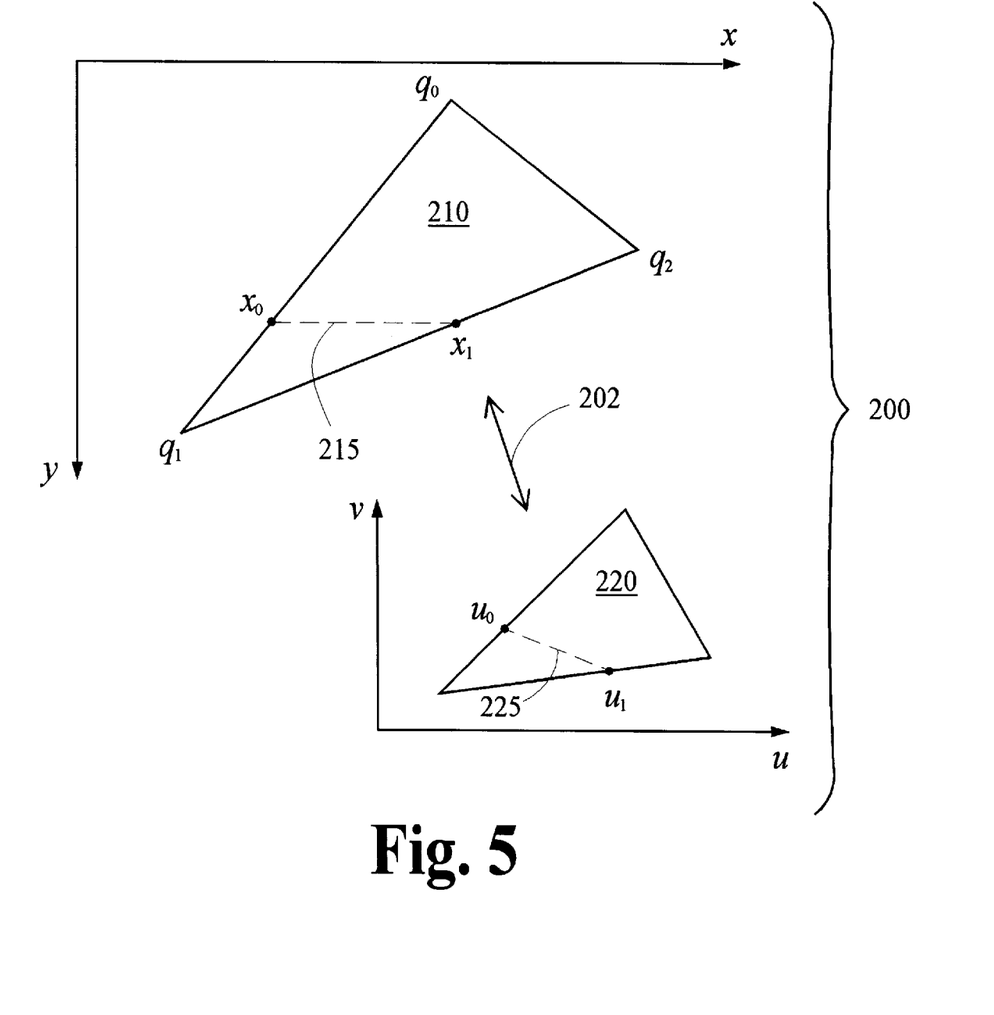
FIG. 5 is a schematic representation of a mapping between a texture space and a screen or image space.

Referring to FIG. 5, region 210 in screen or image space (x,y) corresponds to region 220 in texture space (u,v) according to one or more transformations 202 in a mapping system 200. Region 210 is triangular in shape and, according to a mapping onto a surface in object space (x',y',z') not shown in the figure, has inverse weights $q_0$, $q_1$ and $q_2$ at respective vertices. As discussed above and shown in expressions 18a and 18b, for example, the average level $\hat{d}$ may be obtained from a ratio of areas or perimeters of regions 220 and 210. A ratio of some other feature such as the length of the longest side may be used. Preferably, the average inverse weight $\hat{q}$ is calculated as the geometric mean of the inverse weights at the vertices. Other calculations of these weights may be used as desired.

Preferably, step 402 also initializes a lookup table for the $\log_2$ function. A lookup table is not required but is generally preferred since it is usually more efficient than an algorithmic calculation. The lookup table may also be provided by some other source such as non-volatile storage.

In step 403, additional constants for a respective scanline are initialized. These constants include the inverse weight $q_A$ for the pixel at the start of the scanline, the inverse weight $q_B$ for the pixel at the end of the scanline, and the interpolation step size for the inverse weight across the respective scanline. Referring to FIG. 5, scanline 215 begins at $x=x_0$ and ends at $x=x_1$. The corresponding line 225 in texture space begins at $u=u_0$ and ends at $u=u_1$. The inverse weights for the start and end of this scanline may be calculated by interpolating the inverse weights associated with the adjacent vertices according to the vertical position of the scanline end points relative to the vertical positions of the vertices. For example, $q_A$ is obtained by interpolating $q_0$ and $q_1$, and $q_B$ is obtained by interpolating $q_0$ and $q_2$. The interpolation step size may be obtained by dividing the difference between ending and starting inverse weights $(q_B - q_A)$ by the number of interpolation points, which is usually equal to the number of pixels along the scanline from $x=x_0$ to $x=x_1$.

In step 404, the appropriate filter level is determined for each pixel in the respective scanline. This is accomplished by computing an inverse weight q for each pixel and then determining the appropriate level d according to some function of the inverse weight such as expression 17. An inverse weight q may be calculated by interpolating the starting and ending inverse weights, $q_A$ and $q_B$.

Step 405 determines if all scanlines have been processed for a specific surface or region. If not, processing continues with step 403 for the next scanline. If all scanlines have been processed, step 406 determines if all regions have been processed. If not, processing continues with step 402 for the next region. If all regions have been processed, the illustrated portion of the process ends. As may be seen from the foregoing discussion, the several constants and weights may be calculated in a wide variety of ways without departing from the scope of the present invention.

What is claimed is:

1. A method for generating output signals representing an image comprising a plurality of pixels, each pixel having a respective location within the image, the method comprising:

receiving a first signal representing position of a surface to be displayed in the image, receiving a second signal representing texture of at least a portion of the surface, determining a correspondence between a respective one of the pixels and an area of the texture, wherein the correspondence is determined according to the first and second signals and the position of the respective pixel within the image, and wherein the correspondence includes a homogeneous coordinate, generating a third signal representing the respective pixel, wherein the third signal is generated by interpolating a plurality of filtered representations of the texture according to a level obtained from a function of the homogeneous coordinate, and generating a respective output signal representing information conveyed by said third signal, wherein the second signals represent texture of a portion of the surface that is triangular and has three vertices with corresponding homogeous coordiates $w_0$, $w_1$ and $w_2$, respectively, and the function d of the homogeneous coordiate w is $d=\hat{d}+2\log(\hat{q})-2\log(q)$, where d is a constant representing an average level across the triangular portion, $q=1/w$, $q_0=1/w_0$, $q_1=1/w_1$, $q_2=1/w_2$, and $\hat{q}=\sqrt[3]{q_0 q_1 q_2}$.

2. A method according to claim 1 wherein the correspondence is determined by an inverse mapping from an image space in which the image is defined to a texture space in which the texture is defined.

3. A method according to claim 1 wherein the correspondence is determined by a forward mapping from a texture space in which the texture is defined to an image space in which the image is defined.

4. A method according to claim 1 wherein the average level is derived from a ratio of a single-dimensional measure in a texture space to a corresponding single-dimensional measure in an image space.

5. A method according to claim 1 wherein the plurality of filtered representations are arranged in discrete levels having resolutions that decrease between the discrete levels by a factor of one-half.

6. An apparatus for generating output signals representing an image comprising a plurality of pixels, each pixel having a respective location within the image, the apparatus comprising:

means for receiving a first signal representing position of a surface to be displayed in the image, means for receiving a second signal representing texture of at least a portion of the surface, means for determining a correspondence between a respective one of the pixels and an area of the texture, wherein the correspondence is determined according to the first and second signals and the position of the respective pixel within the image, and wherein the correspondence includes a homogeneous coordinate, means for generating a third signal representing the respective pixel, wherein the third signal is generated by interpolating a plurality of filtered representations of the texture according to a level obtained from a function of the homogeneous coordinate, and means for generating a respective output signal representing information conveyed by said third signal, wherein the second signals represent texture of a portion of the surface that is triangular and has three vertices with corresponding homogeous coordiates $w_0$, $w_1$ and $w_2$, respectively, and the function d of the homogeneous coordiate w is $d=\hat{d}+2\log(\hat{q})-2\log(q)$, where d is a constant representing an average level across the triangular portion, $q=1/w$, $q_0=1/w_0$, $q_1=1/w_1$, $q_2=1/w_2$, and $\hat{q}=\sqrt[3]{q_0 q_1 q_2}$.

7. An apparatus according to claim 6 wherein the correspondence is determined by an inverse mapping from an image space in which the image is defined to a texture space in which the texture is defined.

8. An apparatus according to claim 6 wherein the correspondence is determined by a forward mapping from a texture space in which the texture is defined to an image space in which the image is defined.

9. An apparatus according to claim 6 wherein the average level is derived from a ratio of a single-dimensional measure in a texture space to a corresponding single-dimensional measure in an image space.

10. An apparatus according to claim 6 wherein the plurality of filtered representations are arranged in discrete levels having resolutions that decrease between the discrete levels by a factor of one-half.

11. A medium readable by a machine embodying a program of instructions for execution by said machine to perform a method for generating output signals representing an image comprising a plurality of pixels, each pixel having a respective location within the image, the method comprising:

receiving a first signal representing position of a surface to be displayed in the image, receiving a second signal representing texture of at least a portion of the surface, determining a correspondence between a respective one of the pixels and an area of the texture, wherein the correspondence is determined according to the first and second signals and the position of the respective pixel within the image, and wherein the correspondence includes a homogeneous coordinate, generating a third signal representing the respective pixel, wherein the third signal is generated by interpolating a plurality of filtered representations of the texture according to a level obtained from a function of the homogeneous coordinate, and generating a respective output signal representing information conveyed by said third signal, wherein the second signals represent texture of a portion of the surface that is triangular and has three vertices with corresponding homogeous coordiates $w_0$, $w_1$ and $w_2$, respectively, and the function d of the homogeneous coordiate w is $d=\hat{d}+2\log(\hat{q})-2\log(q)$, where d is a constant representing an average level across the triangular portion, $q=1/w$, $q_0=1/w_0$, $q_1=1/w_1$, $q_2=1/w_2$, and $\hat{q}=\sqrt[3]{q_0 q_1 q_2}$.

12. A medium according to claim 11 wherein the correspondence is determined by an inverse mapping from an image space in which the image is defined to a texture space in which the texture is defined.

13. A medium according to claim 11 wherein the correspondence is determined by a forward mapping from a texture space in which the texture is defined to an image space in which the image is defined.

14. A medium according to claim 11 wherein the average level is derived from a ratio of a single-dimensional measure in a texture space to a corresponding single-dimensional measure in an image space.

15. A medium according to claim 11 wherein the plurality of filtered representations are arranged in discrete levels having resolutions that decrease between the discrete levels by a factor of one-half.

16. A device for generating output signals representing an image comprising a plurality of pixels, each pixel having a respective location within the image, said device comprising:

one or more signal paths adapted to receive a first signal representing position of a surface to be displayed in an image and a second signal representing texture of at least a portion of the surface, and processing circuitry adapted to determine a correspondence between a respective pixel in the image and an area of the texture, wherein the correspondence is determined according to the first and second signals and position of the respective pixel within the image, and wherein the correspondence includes a homogeneous coordinate, generate a third signal representing the respective pixel, wherein the third signal is generated by interpolating a plurality of filtered representations of the texture according to a level obtained from a function of the homogeneous coordinate, and generate a respective output signal representing information conveyed by the third signal, wherein the second signals represent texture of a portion of the surface that is triangular and has three vertices with corresponding homogeous coordiates $w_0$, $w_1$ and $w_2$, respectively, and the function d of the homogeneous coordiate w is $d = \hat{d} + 2\log(\hat{q}) - 2\log(q)$, where $\hat{d}$ is a constant representing an average level across the triangular portion, $q = 1/w$, $q_0 = 1/w_0$, $q_1 = 1/w_1$, $q_2 = 1/w_2$, and $\hat{q} = \sqrt[3]{q_0 q_1 q_2}$.

17. A device according to claim 16 wherein said output signals are suitable for input to a device for printing said image onto a medium.

18. A device according to claim 16 wherein said output signals are suitable for input to a computer monitor.

19. A computer system comprising a processor, random access memory coupled to said processor and a display device coupled to said processor, wherein said processor executes program instructions stored in said random access memory that cause said computer system to:

receive a first signal representing position of a surface to be displayed in an image and a second signal representing texture of at least a portion of the surface, determine a correspondence between a respective pixel in the image and an area of the texture, wherein the correspondence is determined according to the first and second signals and position of the respective pixel within the image, and wherein the correspondence includes a homogeneous coordinate, generate a third signal representing the respective pixel, wherein the third signal is generated by interpolating a plurality of filtered representations of the texture according to a level obtained from a function of the homogeneous coordinate, and generate an output signal representing information conveyed by the third signal, wherein the second signals represent texture of a portion of the surface that is triangular and has three vertices with corresponding homogeneous coordiates $w_0$, $w_1$ and $w_2$, respectively, and the function d of the homogeneous coordiate w is $d = \hat{d} + 2\log(\hat{q}) - 2\log(q)$, where $\hat{d}$ is a constant representing an average level across the triangular portion, $q = 1/w$, $q_0 = 1/w_0$, $q_1 = 1/w_1$, $q_2 = 1/w_2$, and $\hat{q} = \sqrt[3]{q_0 q_1 q_2}$.

20. A computer system according to claim 19 that comprises a printer coupled to said processor so as to receive said output signal and to print a portion of said image in response thereto.

21. A computer system according to claim 19 that comprises a monitor coupled to said processor so as to receive said output signal and to display a portion of said image in response thereto.

* * * * *